United States Patent
Short et al.

(10) Patent No.: US 9,830,506 B2
(45) Date of Patent: Nov. 28, 2017

(54) METHOD OF APPARATUS FOR CROSS-MODAL FACE MATCHING USING POLARIMETRIC IMAGE DATA

(71) Applicant: U.S. Army Research Laboratory, Washington, DC (US)

(72) Inventors: Nathaniel J. Short, Annapolis, MD (US); Shuowen Hu, Silver Spring, MD (US); Alex L. Chan, Germantown, MD (US); Kristan P. Gurton, Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 52 days.

(21) Appl. No.: 14/936,079

(22) Filed: Nov. 9, 2015

(65) Prior Publication Data

US 2017/0132458 A1    May 11, 2017

(51) Int. Cl.
  *G06K 9/00* (2006.01)
  *G06T 7/00* (2017.01)
  (Continued)

(52) U.S. Cl.
  CPC ........ *G06K 9/00288* (2013.01); *G01J 5/0025* (2013.01); *G01J 5/025* (2013.01);
  (Continued)

(58) Field of Classification Search
  CPC .. G01J 3/447; G01J 4/04; G01J 5/0825; G01J 5/0025; G01J 5/025; G01J 2005/0077;
  (Continued)

(56) References Cited

U.S. PATENT DOCUMENTS 4,490,016 A * 12/1984 Schneider .............. G01N 21/21
                                                359/246
7,719,684 B2 * 5/2010 Mattox .................... G01J 4/04
                                                356/367

(Continued)

FOREIGN PATENT DOCUMENTS

WO    2005/104009 A1    11/2005

OTHER PUBLICATIONS

Nathaniel Short, et al.; "Improving cross-modal face recognition using polarimetric imaging"; Optics Letters vol. 40, No. 6, Mar. 15, 2015; pp. 882-885.

(Continued)

*Primary Examiner* — Kanjibhai Patel
(74) *Attorney, Agent, or Firm* — Eric Brett Compton

(57) ABSTRACT

A method and apparatus for cross-modal matching with polarimetric thermal image data is provided. According to one embodiment, the method comprises receiving a plurality of polarimetric thermal images of a face acquired by a polarimetric thermal imaging camera, extracting features of the face from each of the plurality of images to generate a plurality of feature vectors for each of the plurality of images, compositing the feature vectors for each of the plurality of images together to form composite feature vectors and cross-modally matching the composite feature vectors with other feature vectors, in order to determine whether the face matches a face represented by the other feature vectors.

21 Claims, 15 Drawing Sheets

(51) Int. Cl.
*G01J 5/08* (2006.01)
*G01J 5/00* (2006.01)
*G01J 5/02* (2006.01)

(52) U.S. Cl.
CPC ........ *G01J 5/0825* (2013.01); *G06K 9/00255* (2013.01); *G06K 9/00268* (2013.01); *G06T 7/0085* (2013.01); *G01J 2005/0077* (2013.01)

(58) Field of Classification Search
CPC .................. G01N 21/21; G06K 9/4604; G06K 2009/0059; G06K 9/00288; G06K 9/00255; G06K 9/00268; G06T 7/0085
USPC .......................................................... 382/118
See application file for complete search history.

(56) References Cited

U.S. PATENT DOCUMENTS

| | | | |
|---|---|---|---|
| 8,368,889 B2* | 2/2013 | Schwiegerling | G01J 4/04 356/367 |
| 8,457,437 B2* | 6/2013 | Peterson | G06T 5/003 382/266 |
| 8,514,380 B2* | 8/2013 | Zou | G01N 21/21 356/364 |
| 8,593,452 B2* | 11/2013 | Solem | G06K 9/00221 345/419 |
| 8,600,120 B2* | 12/2013 | Gonion | G06F 1/3231 382/118 |
| 8,760,517 B2 | 6/2014 | Sarwar et al. | |
| 8,917,914 B2* | 12/2014 | Zheng | G06K 9/00275 340/5.53 |
| 9,405,965 B2* | 8/2016 | Klare | G06K 9/00288 |
| 9,405,969 B2* | 8/2016 | Niu | G06K 9/4642 |

OTHER PUBLICATIONS

Kristan P. Gurton, et al.; "Enhanced facial recognition for thermal imagery using polarimetric imaging"; Optics Letters vol. 39 No. 13; Jul. 1, 2014; pp. 3857-3859.

Kristan P. Gurton, et al.; LWIR Polarimetry for Enhanced Facial Recognition in Thermal Imagery; Proc. of SPIE vol. 9099, 2014; pp. 90990G-1-90990G-9.

Alex J. Yuffa, et al.; "Three-dimensional facial recognition using passive long-wavelength infrared polarimetric imaging"; Applied Optics vol. 53, No. 36, Dec. 20, 2014; pp. 8514-8521.

U.S. Appl. No. 14/617,393, filed Feb. 9, 2015 to Gorden W. Videen, Kristan P. Gurton, and Alexey J. Yuffa titled "Method for Modeling a Three-Dimensional Topological Surface of an Object from Long-Wave-Infrared Radiation Emitted from the Object".

N. Short, A. Yuffa, G. Videen, S. Hu, "Effects of surface materials on polarimetric-thermal measurements: Applications to face recognition", Applied Optics, vol. 55(19), pp. 5226-5233, 2016.

B.S. Riggan, N. Short, S. Hu, "Optimal feature learning and discriminative framework for polarimetric thermal to visible race recognition", IEEE Winter Conf. on Applications of Computer Vision, 2016.

S. Hu, N. Short, B.S. Riggan et al., "A polarimetric thermal database for face recognition research", IEEE Conf. on Computer Vision Pattern Recognition Biometrics Workshop, 2016.

B.S. Riggan, N. Short, S. Hu, H. Kwon, "Estimation of visible spectrum faces from polarimetric thermal faces", IEEE Int. Conf. on Biometrics Theory, Applications and Systems, 2016.

C. Gordon, M. Acosta, N. Short, S. Hu, A. Chan, "Toward automated face detection in thermal and polarimetric thermal imagery", SPIE Proc. Defense and Commercial Sensing, 984212, 2016.

N. Short, S. Hu, P. Gurram, K. Gurton, "Exploiting polarization-state information for cross-spectrum face recognition", IEEE Int. Conf. on Biometrics: Theory, Applications and Systems, 2015.

* cited by examiner

METHOD OF APPARATUS FOR CROSS-MODAL FACE MATCHING USING POLARIMETRIC IMAGE DATA

GOVERNMENT INTEREST

Governmental Interest—The invention described herein may be manufactured, used and licensed by or for the U.S. Government. Research underlying embodiments of the present invention was sponsored by the U.S. Army Research Laboratory (ARL).

FIELD

Embodiments of the present invention generally relate to a method and apparatus for cross-modal face matching using polarimetric image data.

BACKGROUND

Automatic facial recognition has a wide range of applications in the commercial, military, and government sectors, spanning from tagging people in social networking websites to surveillance for homeland security. Face recognition research has predominantly focused on the visible spectrum, addressing challenges such as illumination variations, pose, and image resolution. However, for surveillance during nighttime, the lack, or absence, of illumination prevents cameras operating in the visible-light spectrum from being used discreetly and effectively. Thermal imaging measures radiation in the mid-wave infrared (MWIR) and long-wave infrared (LWIR) spectra, which is naturally emitted by living tissue, and therefore is a highly practical imaging modality for nighttime operation. However, as most databases and watch lists only contain facial imagery in the visible spectrum, it is difficult to match an unknown thermal probe image of an individual's face to a set of known visible gallery images. This is referred to as cross-modal or heterogeneous face recognition: seeking to match probe face images acquired in one imaging modality to gallery face images from a different imaging modality.

Several recent efforts have attempted to address cross-modal, thermal-to-visible face recognition. Due to the large modality gap caused by differences in phenomenology (reflectance for visible imaging and emittance for thermal imaging), the measured visible face signatures are very different from the thermal face signatures. Recently, methods consisting of preprocessing, feature extraction, and classification have been met with limited success however, since identification performance was still less than 55% for thermal-to-visible face recognition. Thermal-to-visible face recognition algorithm performance may be fundamentally limited by the degree of correlation between the visible and thermal facial signatures, due to phenomenology and the lower spatial resolution in the thermal spectrum arising from the longer wavelength.

Therefore, there is a need in the art for improved cross-modal face matching.

BRIEF SUMMARY

Embodiments of the present invention relate to cross-modal face matching using polarimetric image data. A method and apparatus for cross-modal matching with polarimetric image data is provided. According to one embodiment, the method comprises receiving a plurality of polarimetric images of a face acquired by a thermal imaging camera, extracting features of the face from each of the plurality of images to generate a plurality of feature vectors for each of the plurality of images, compositing the feature vectors for each of the plurality of images together to form composite feature vectors and cross-modally matching the composite feature vectors with other feature vectors in order to determine whether the face matches a face represented by the other feature vectors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention are directed to a method and apparatus for cross-modal face matching using polarimetric image data. Polarimetric imaging in the thermal spectrum is sensitive to changes in surface texture and geometry. The polarization-state of radiation emission (i.e., polarimetric image data) provides geometric and texture information about the surface of the imaged face, for example, prominent facial features of a person's face. For cross-modal recognition, the combination of polarimetric face features with conventional thermal face features provides a stronger correlation with the visible light feature representation and leads to better matching results than conventional thermal alone. For within-modal/spectrum matching, the polarization-state information provides fine details of the face that improve the discriminability over conventional thermal face images.

For example, in some embodiments, image data of a face is captured by a thermal camera and contains several component parts of data for each pixel in the image, each component part forming an "image" individually, i.e., a collection of pixels, each pixel representing a quantity of an attribute at the physical location of the face. Feature extraction is performed on each of the images such that a feature vector is formed for each pixel in each polarimetric image (generally there are three or four polarimetric images). In some embodiments, the feature vector contains values indicating strength of an edge and direction of the edge for each pixel corresponding to a facial location. The feature vectors are averaged with other feature vectors in the polarimetric images with the same pixel location to generate a composite feature vector set. The composite feature vector set can then be matched with cross-modal data, i.e., thermal images, visible images, or the like, to produce a very accurate matching result. In some embodiments, the composite feature vector set can be used to identify someone for security purposes, validate security access or the like.

Figure 1:
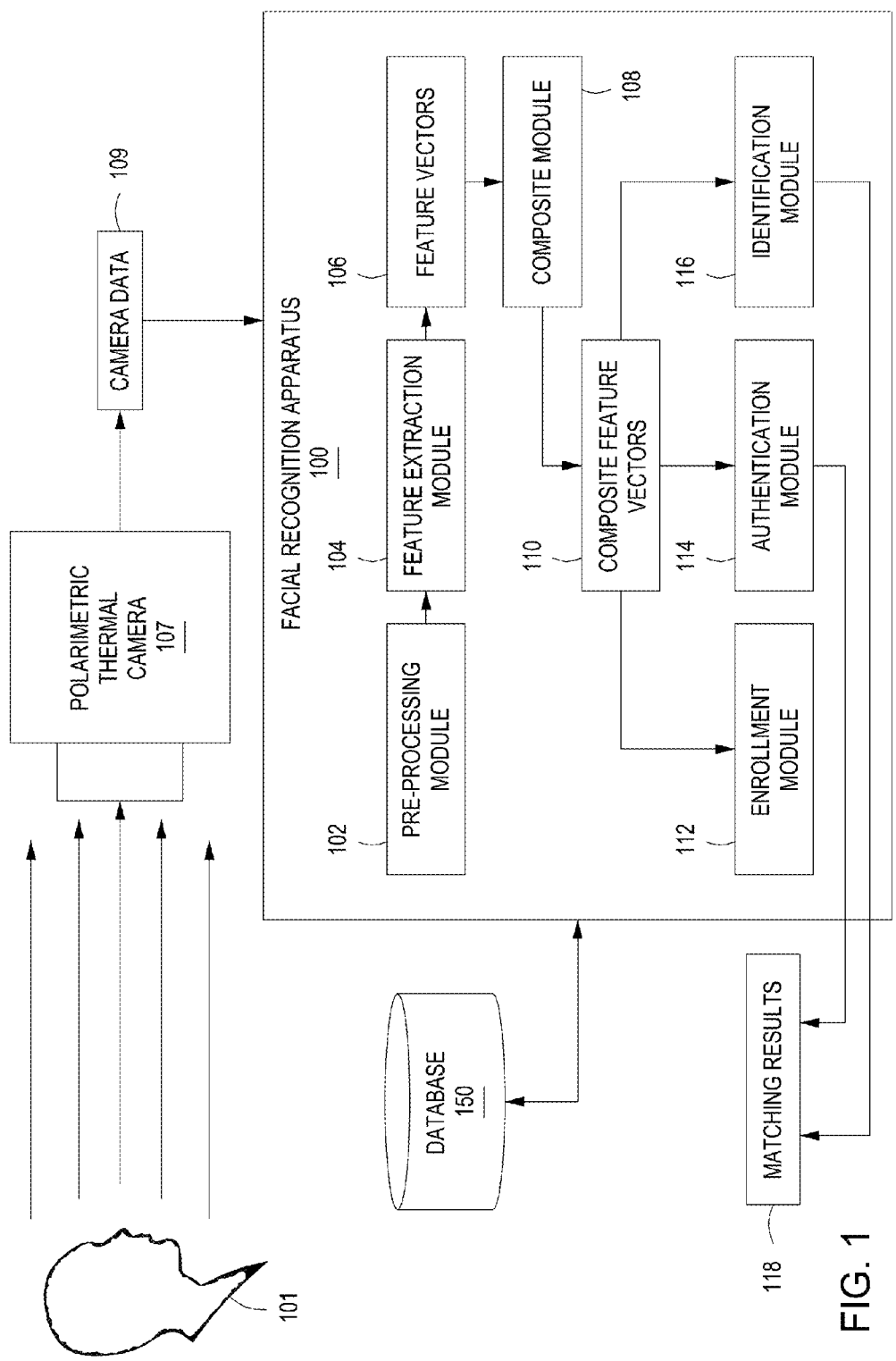
FIG. 1 is a block diagram depicting a facial recognition apparatus in accordance with exemplary embodiments of the present invention.

FIG. 1 is a block diagram depicting a facial recognition apparatus 100 in accordance with exemplary embodiments of the present invention.

The facial recognition apparatus 100 comprises a pre-processing module 102, a feature extraction module 104, a composite module 108, an enrollment module 112, an authentication module 114 and an identification module 116.

A thermal polarimetric camera 107 is coupled to the facial recognition apparatus 100. Thermal polarimetric camera 107 is configured to acquire thermal images representative of thermal radiation emitted by one or more target object(s) such as thermal radiation-emitting face 101. Thermal imaging involves measuring heat emitted from objects to form images. Heat is emitted by all faces above absolute zero and the amount of radiation emitted by faces increase with temperature. Thermal imaging allows one to see variations in temperature across a particular face. When viewed through a thermal imaging camera, warmer objects are generally distinguishable from cooler backgrounds. A thermal polarimetric camera captures radiation intensities at various polarization states (e.g., 0, 45, 90, and 135 degrees) using a polarizing grid. The preferred polarization state of an object emitting thermal radiation is related to the surface normal of the object. One spectrum of thermal imaging that is of interest is the longwave IR band, which is defined as electromagnetic radiation or light having wavelengths of about 8-15 µm. This spectrum is generally emitted by humans and other warm-blooded animals, specifically human skin which has an emissivity>0.9. However, those skilled in the art will appreciate that embodiments of the present invention are not limited to polarimetric imaging using the LWIR spectra and that, in embodiments of the present invention, other spectra can be used for polarimetric thermal imaging also.

In exemplary embodiments, face 101 is oriented generally in the direction of the polarimetric thermal camera 107. The thermal polarimetric camera 107 and the facial recognition apparatus 100 do not require a light source to illuminate the face 101. In some embodiments, the thermal camera 107 is a polarimetric camera having a focal plane array (FPA) of pixels having a defined spectral response range. For example, in some embodiments, the polarimetric camera may be equipped with, but is not limited to, a Stirling-cooled mercury cadmium telluride focal-plane array of 640 by 480 pixels. In this embodiment, the array has a spectral response range of 7.5-11.1 µm. In this embodiment, the thermal camera 107 is configured to record a sequence of 32-bit images at a frame rate of 120 Hz, and a well-known Fourier modulation technique is applied to the images to obtain radiation data of face 101 in the form of a Stokes Vector recorded by camera 107, collectively referred to as camera data 109. Those skilled in the art will appreciate that embodiments of the present invention may include polarimetric thermal cameras 107 having different sized arrays, spectral responses, and configured to record images of various resolutions and frame rates.

When positioned in a non-illuminated environment containing face 101, thermal camera 107 captures the radiation emitting from the face 101. The polarimetric thermal camera 107 acquires thermal data emitted from the face 101 and generates camera data 109 corresponding to the radiation (e.g., LWIR) emitted from the face 101. In one embodiment, the camera data 109 includes the polarization state of the total wave emanating from the face along with several other parameters as components of the Stokes vector. Stokes vectors describe a polarization-state of captured light. Degree of Linear Polarization (DoLP) approximates the amount of linearly polarized light emitting from a source. Those of ordinary skill in the art recognize that the Stokes vector comprises 4 elements: 1) total intensity of emitted radiation, 2) tendency of emitted radiation to be horizontally or vertically polarized, 3) tendency of radiation to be polarized at ±45 degree angle, 4) tendency of the radiation being right circularly or left circularly polarized. Those of ordinary skill in the art recognize that the DoLP is calculated using Stokes parameters $S_0$, $S_1$ and $S_2$ by the polarimetric thermal camera 107. The magnitude and direction of the electric field vector at each pixel is determinable based on these four elements. In this embodiment, the camera data 109 comprises at least the Stokes parameters ($S_0$; $S_1$; $S_2$; and DoLP) for each pixel of the array of polarimetric thermal camera 107. The polarimetric thermal camera 107 may be configured to output Stokes Vector data directly, or such values may be computed externally by an image processor for the camera data 109. The Stokes parameters may comprise a data vector in camera data 109.

The images recorded by the polarimetric thermal camera 107 contain both reflected and emitted waves. As a consequence of the Fresnel equations, the emitted waves are polarized parallel to the plane of emission, which is defined by the line-of-sight of the camera and the surface normal N. In contrast, reflected waves are polarized perpendicular to this plane. In other words, the emitted and the reflected polarization states are orthogonal.

The facial recognition apparatus 100 is provided with the camera data 109 in order to perform pre-processing to filter the data, recognize and extract facial features from the data, and to perform enrollment, authentication and identification by comparing with cross-modal image data that may include visible image data, thermal image data, or the like. The facial recognition apparatus 100 then returns the matching results 118 indicating the image data that was matched with the data contained camera data 109.

The facial recognition apparatus 100 first performs pre-processing using the pre-processing module 102 on the camera data 109 in order to facilitate subsequent feature extraction, matching, identification and the like. In some embodiments, the camera data 109 is evaluated to determine whether pre-processing is required or not. If pre-processing is required or may be helpful in increasing the accuracy of cross-modal matching, the pre-processing module may perform functions such as increasing the signal to noise ratio by averaging across several frames captured by the polarimetric thermal camera 107, removing speckle noise, averaging pixel values, registering images to canonical coordinates and filtering the images to accentuate edge features. The pre-processing module 102 outputs pre-processed image data to the feature extraction module 104.

Subsequently, the feature extraction module 104 performs edge and feature detection on the preprocessed image data in order to generate feature vectors 106. Every pixel in the processed image data contributes to a feature vector that contains at least a direction and strength of an edge/feature for that pixel. For example, if the image data contains a face, and a pixel in the top left of the image data contains a smooth background, the feature vector corresponding to that pixel will indicate a low strength/direction of an edge. On the other hand, a pixel that contributes to part of a facial feature, such as an eyebrow ridge, or a nose, will contain a higher strength of edge and indicate which direction that edge goes towards. The feature vectors 106 generated by the feature extraction module comprise a set of feature vectors for each polarimetric image. For example, the $S_0$, $S_1$ and $S_2$ polarimetric images each has an associated feature vector set described features and edges within those images.

Once the feature vectors 106 are generated, the composite module 108 composites each feature set across the polarimetric images into one feature vector set referred to as composite feature vectors 110. According to one embodiment, each feature vector across the polarimetric images corresponding to the same pixel in the camera data 109 is averaged into one composite feature vector. In other embodiments, each feature vector may be added across all polarimetric images to produce a composite feature vector. These composite feature vectors are aggregated to form the composite feature vectors 110 generated by the composite module 108.

The enrollment module 112 receives the composite feature vectors 110 and stores the vectors 110 into database 150 for future reference. In a system where authentication is required to access particular locations, documents or the like, the authentication module 114 receives a non-visual identification, e.g., a textual username, and retrieves existing feature vectors from database 150 corresponding to the identity. The composite feature vectors 110 are then matched against the feature vectors from database 150 to authenticate the user. If instead of authentication a client of the facial recognition apparatus 100 desires to see images that match the captured face 101, the identification module 116 generates matching results 118. The matching results 118 comprise one or more cross-modal images that have been successfully matched with the composite feature vectors 110 from all or a subset of enrolled templates. In some embodiments, the cross-modal images include thermal spectrum images, visible spectrum images, or the like, but they are not limited thereto.

Figure 2:
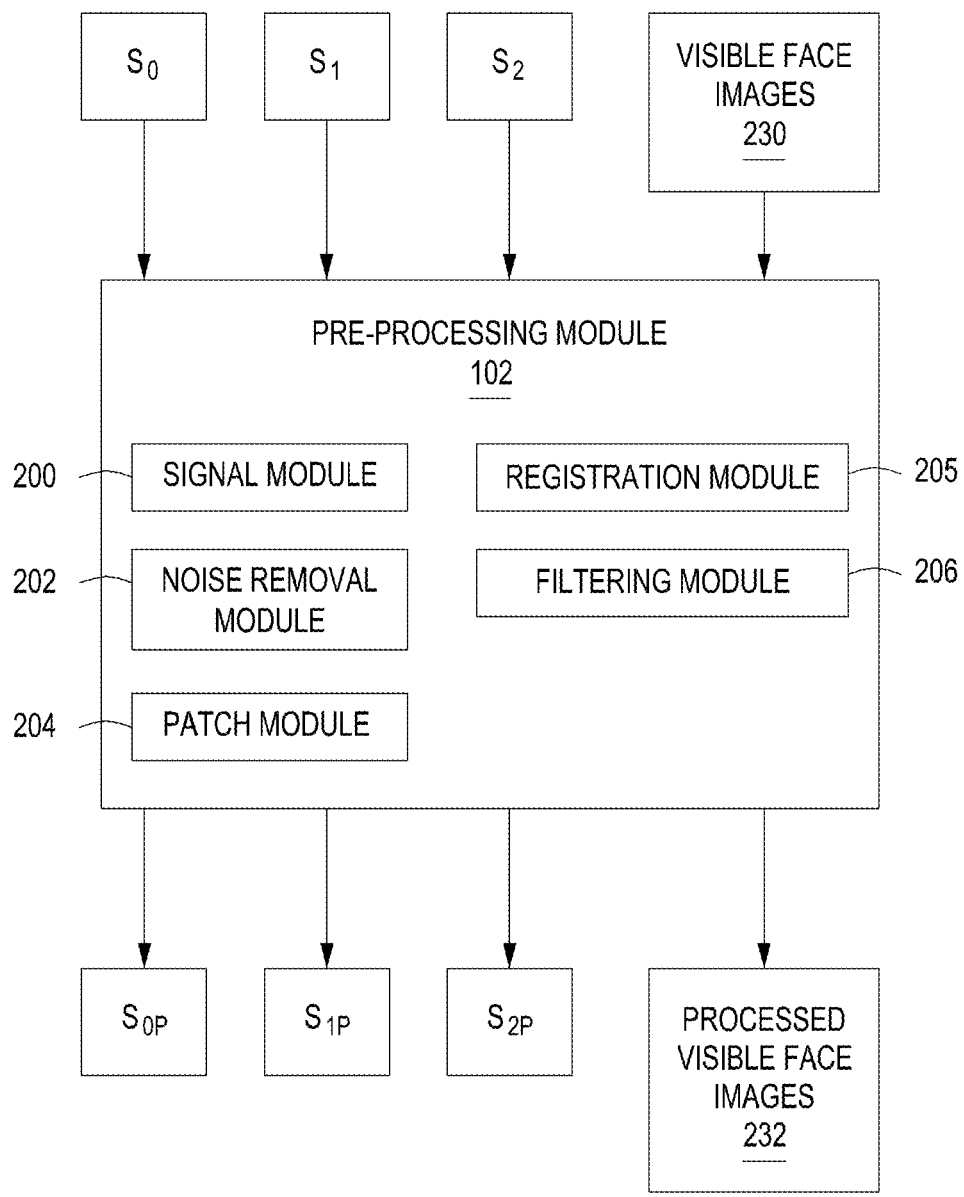
FIG. 2 is a block diagram of a pre-processing module in accordance with exemplary embodiments of the present invention.

FIG. 2 is a block diagram of the pre-processing module 102 in accordance with exemplary embodiments of the present invention. The pre-processing module 102 comprises the signal module 200, the noise removal module 202, the patch module 204, the registration module 205 and the filtering module 206.

The pre-processing module 102 receives camera data in the form of the Stokes images, $S_0$, $S_1$ and $S_2$ in addition to visible face images 230. As described above, the images $S_0$, $S_1$ and $S_2$ contain a different type of value at a pixel corresponding to each location on the face 101. However, in order to enhance feature and edge detection, the pre-processing module 102 performs pre-processing steps, some of which are disclosed herein.

The signal module 200 increases the signal to noise ratio of the polarimetric images $S_0$, $S_1$ and $S_2$ by averaging the images across several frames using noise removal module 202. In exemplary embodiments, the thermal camera 107 captures several frames of the face 101 as camera data 109. Thus, there are a plurality of images for each Stokes vector, ordered temporally. Averaging these images across a predetermined number of frames N increases the signal to noise ratio. In exemplary embodiments, the predetermined number of frames is 24, though this can be modified according to need.

If speckle noise necessitates removal, the patch module 204 breaks up the images $S_0$, $S_1$ and $S_2$ into local patches and calculates the local mean and standard deviation of the local patches. Subsequently, the patch module 204 replaces pixel values greater than a calculated value, i.e., outlier values, with a median value of a region. In one embodiment, this calculated value is determined as the local mean+2*(local sdv). In this embodiment, the median value is taken of a 3×3 pixel region.

Figure 10:
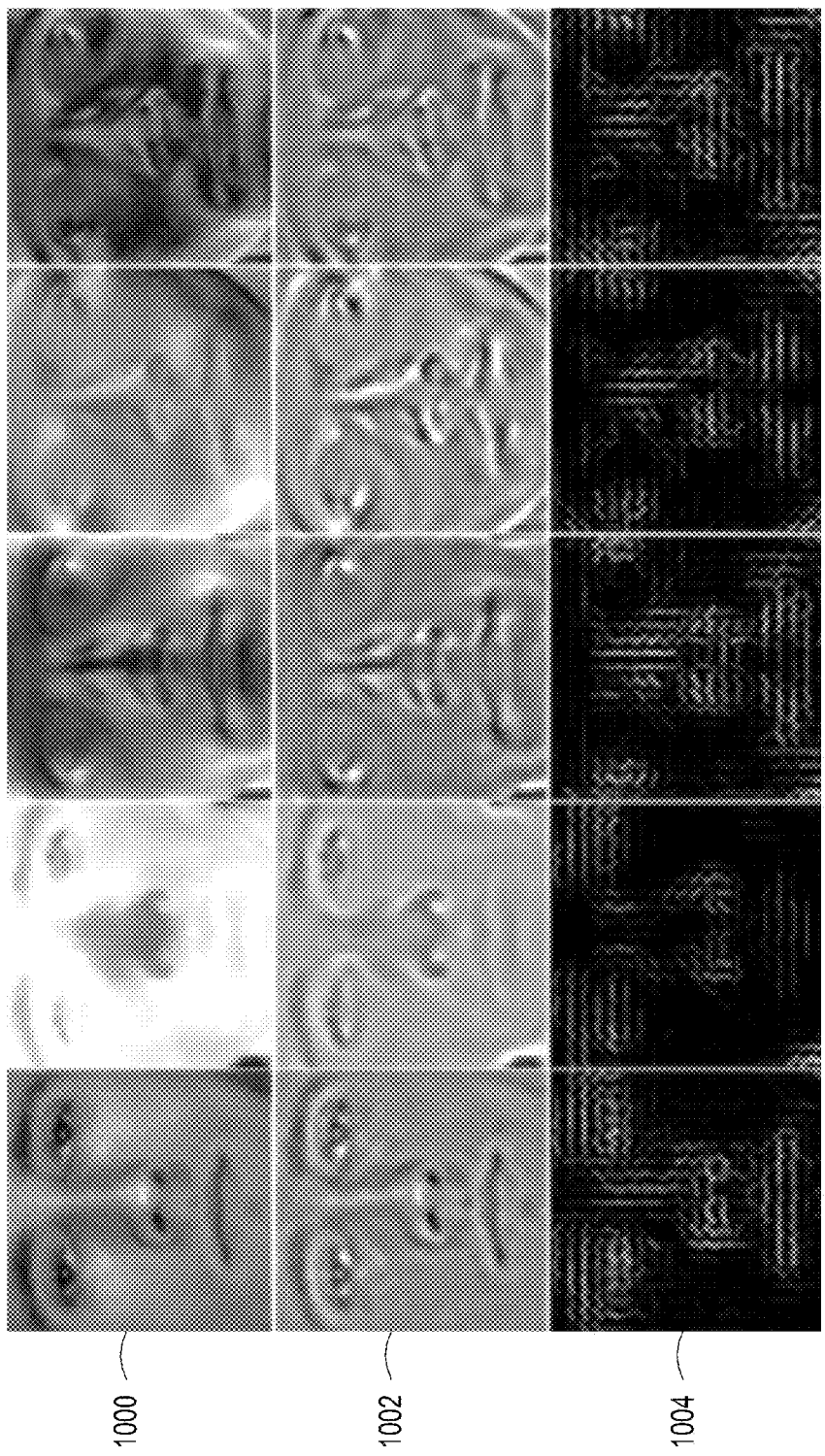
FIG. 10 illustrates visible and polarimetric thermal image data in various stages in accordance with exemplary embodiments of the present invention.

Prior to training and testing of the cross-modal face recognition algorithm, face images are transformed (i.e., aligned or registered) by the registration module 205 to a common spatial coordinate system, referred to as canonical coordinates. According to one embodiment, initially corresponding fiducial points (corner of eyes, tip of nose, and center of mouth, for example) are selected in each visible face image and polarimetric face image $S_0$, $S_1$ and $S_2$. Then, a spatial transformation is computed using the defined fiducial points to align the visible and polarimetric images to the canonical coordinates, where the fiducial points are in fixed positions. FIG. 10 shows an example of a single subject from the database used in this work by the registration module 205. The top row 1000 of FIG. 10 pictures grayscale intensity-based images after aligning to canonical coordinates and cropping. The middle row 1002 shows faces after DoG preprocessing by the filtering module 206.

Since the visible signature and the polarimetric face signature exist in different spectra/domains, preprocessing steps are applied by the filtering module 206 to accentuate distinguishable and correlated facial features between the two domains. According to this embodiment, focus is paid to the edges present in regions around the key facial features, which include the eyes, nose, and mouth for example. To accentuate these details and to reduce high- and low frequency noise, a band-pass filter in the form of a difference of Gaussians (DoG) filter is applied to the visible images 230 and Stokes images by the filtering module 206 to generate polarimetric preprocessed images and visible preprocessed images 232. The DoG preprocessing performed by the filtering module 206 is defined in Eq. (1), and involves the convolution of an image with the difference of two Gaussian kernels with different bandwidth parameters:

$$D(x,y,\sigma_0,\sigma_1) = [G(x,y,\sigma_1) - G(x,y,\sigma_2)] * I(x,y) \quad \text{Eq. 1}$$

where D is the DoG filtered image, * is the convolution operator, G is the Gaussian kernel, defined in Eq. (2), $\sigma_1$ and $\sigma_2$ control the bandwidth of the filter and x and y indicate the pixel location.

$$G(x, y, \sigma) = \frac{1}{\sqrt{2\pi\sigma^2}} e^{\frac{x^2+y^2}{2\sigma^2}} \quad \text{Eq. 2}$$

Figure 3:
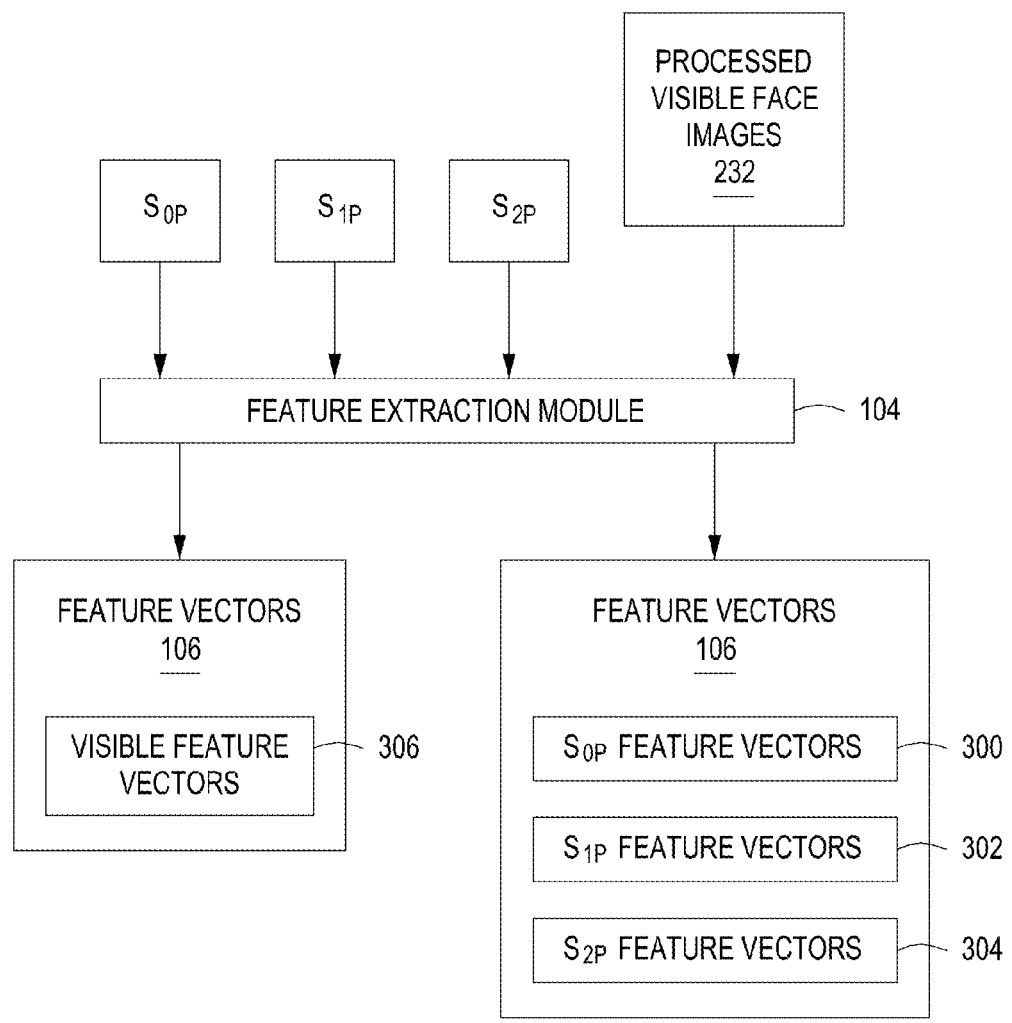
FIG. 3 is a block diagram of a feature extraction module in accordance with exemplary embodiments of the present invention.

FIG. 3 is a block diagram of the feature extraction module 104 in accordance with exemplary embodiments of the present invention. The feature extraction module receives the $S_0p$, $S_1p$, $S_2p$, and visible pre-processed images 232 from the pre-processing module 102. The feature extraction module 104 then generates a set of feature vectors 106 comprising $S_0p$ feature vectors 300, $S_1p$ feature vectors 302, $S_2p$ feature vectors 304, and visible feature vectors 306. These feature vectors 300-306 contain values of strength and direction of an edge for each pixel or group of pixels in each of the pre-processed images $S_0p$, $S_1p$, $S_2p$, pre-processed visible images 232. The visible feature vectors 306 are used for enrollment in the cross-modal face matching workflow and are not used to create the composite feature vectors.

In one embodiment, features are extracted from each of the DoG filtered images using a histogram of oriented gradients (HOG) feature representation. The HOG feature provides robust encoding of distinguishable edge magnitude as well as orientation information for both visible and polarimetric face signatures. The feature extraction module 104 then performs dimensionality reduction using principal component analysis (PCA), and the resulting features are used for classification and recognition of faces. In this embodiment, Support Vector Machine (SVM), known to those of ordinary skill in the art, is utilized by the feature extraction module 104 to build models for classification of features. The bottom row 1004 of FIG. 10 provides a visual representation of the extracted edge features that comprise the feature vectors 106, where vectors representing directions 0 through 180 degrees are shown for each local region. The grayscale intensity of the vector indicates the magnitude of the local gradient in the direction of the vector. One skilled in the art will appreciate that other embodiments of the present invention may utilize alternative edge-based features and classification methods for creation and recognition of the composite feature vectors.

Figure 4:
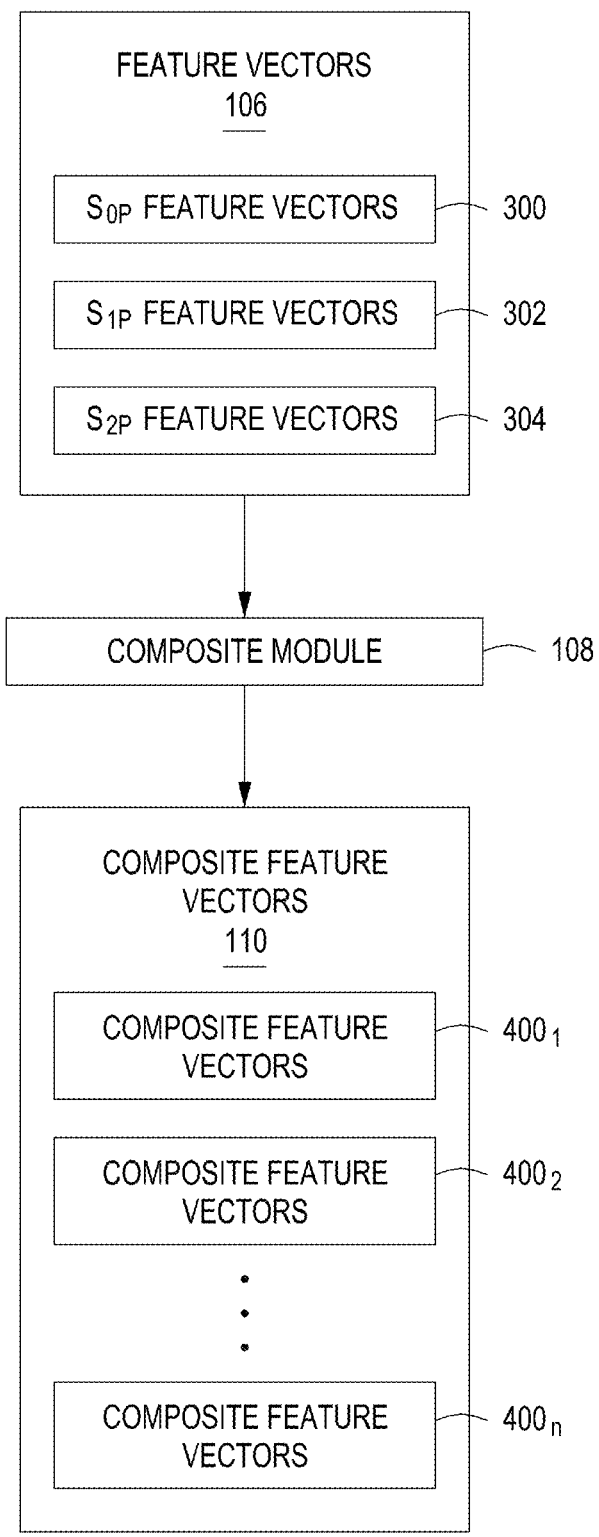
FIG. 4 is a block diagram of a composite module in accordance with exemplary embodiments of the present invention.

FIG. 4 is a block diagram of the composite module 108 in accordance with exemplary embodiments of the present invention.

The composite module 108 receives the feature vectors 106, which comprises the $S_0p$ feature vectors 300, the $S_1p$ feature vectors 302 and the $S_2p$ feature vectors 304. The composite module then performs an element-wise average of these three feature vectors 300, 302 and 304 with each other to generate composite feature vectors 110. The composite feature vectors 110 comprise composite feature vector $400_1$ to $400_n$.

Figure 11:
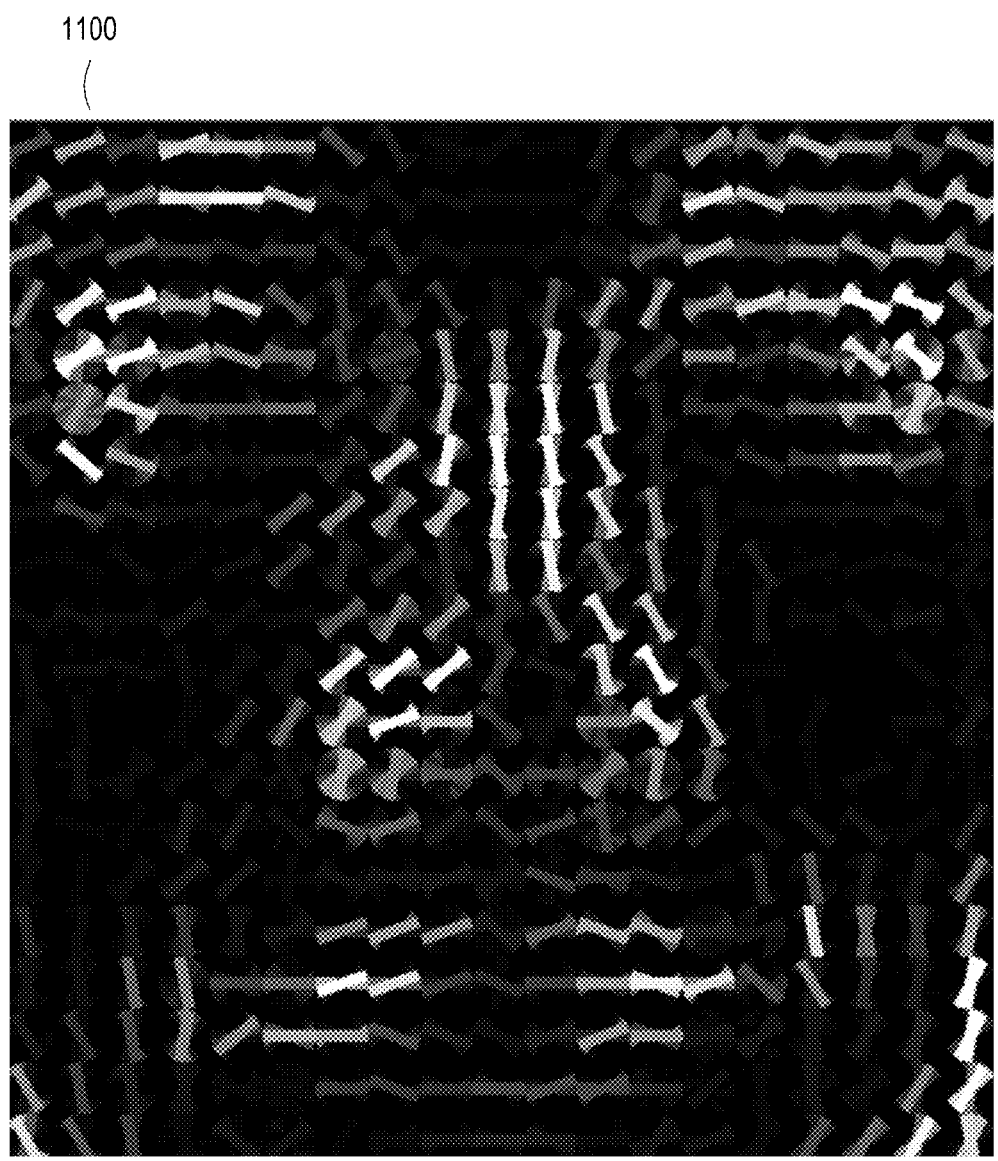
FIG. 11 illustrates a composite feature vector set in accordance with exemplary embodiments of the present invention.

As can be observed in FIG. 10, the Stokes images provide complementary information about the key structures of the human face. For example, the $S_0$ image provides highly correlated details around the ocular region (eyes and eyebrows) between the thermal and visible faces. In contrast, $S_1$ and $S_2$ provide a higher degree of correlation to the visible face signature around the nose and mouth regions. Therefore the composite module 108 produces a composite representation derived from the feature-level fusion of the HOG representations of each Stokes image $S_0p$, $S_1p$ and $S_2p$. The fusion approach combines local edge magnitude and directional information by averaging the values across each spatial region of the HOG feature sets corresponding to the three Stokes images. FIG. 11 provides a visual illustration 1100 of the proposed composite feature representation. It can be seen that local regions across all the Stokes images have been combined into the composite image, providing a higher level of correlation to the visible spectrum feature representation, thus facilitating cross-modal face recognition. Here, the $S_0$, $S_1$, and $S_2$ components are represented by grayscale values. The intensity of the grayscale band indicates the strength of the local edges as measured in the corresponding Stokes image.

Figure 5:
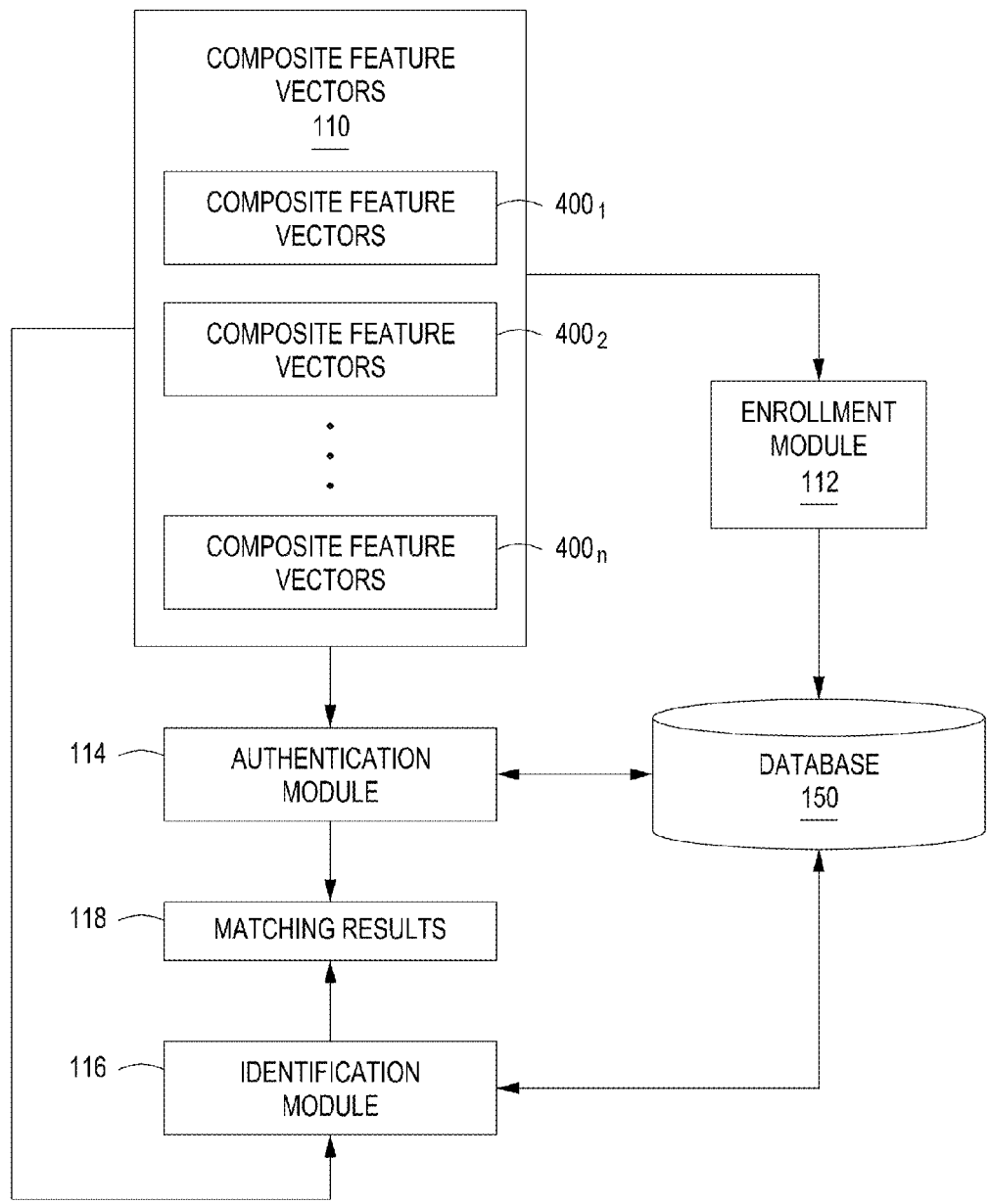
FIG. 5 is a block diagram of an authentication module, the identification module and the enrollment module in accordance with exemplary embodiments of the present invention.

FIG. 5 is a block diagram of the authentication module 114, the identification module 116 and the enrollment module 112 in accordance with exemplary embodiments of the present invention.

The composite feature vectors 110 are received by the enrollment module 112, the authentication module 114, or the identification module 116. The enrollment module 112 can "enroll", or store, the composite feature vectors 110 as a set in database 150. The authentication module 114 can determine if a composite feature vector 110 and an identifying element, e.g., identification number, user name, matches a composite feature vector enrolled, or stored, in the database 150 with that same identifying element. The identification module 116 can determine whether the facial features represented by the composite feature vectors 110 are matched with images of the same or other spectrums stored in database 150. In some embodiments, the identification module 116 retrieves images from the database 150 which are non-polarimetric, and extracts feature vectors to compare with the composite feature vectors 110 to determine whether a match exists. In other embodiments, the database 150 may store feature vectors of various cross-modal images, and the identification module 116 retrieves those feature vectors to compare with the composite feature vectors 110. Finally, if there are many matching results, the identification module 116 returns the matching results 118 for further analysis and/or processing.

Figure 6:
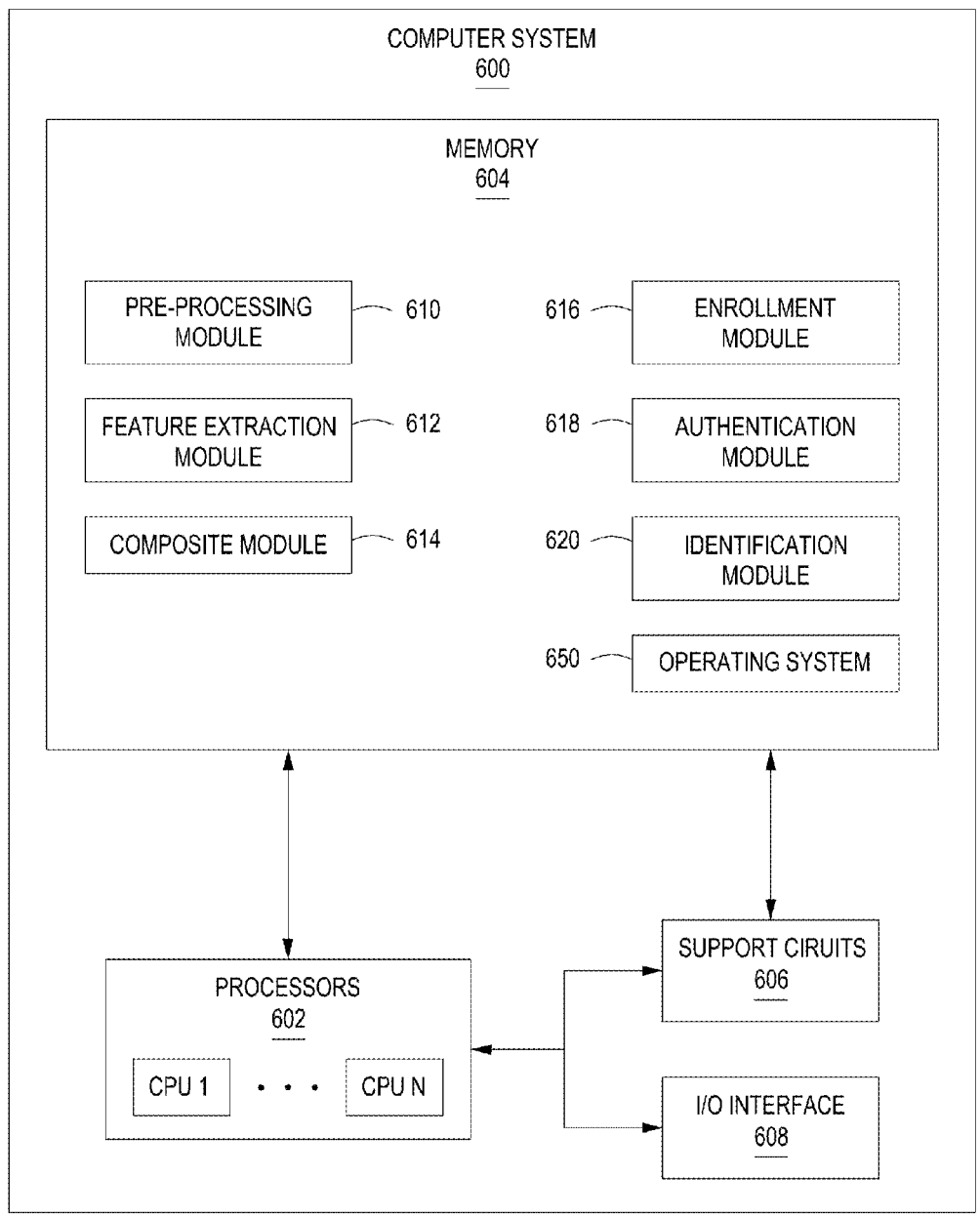
FIG. 6 is a block diagram of a computer system in accordance with exemplary embodiments of the present invention.

FIG. 6 is a block diagram of a computer system 600 implementing the facial recognition apparatus 100 shown in FIGS. 1-5 in accordance with exemplary embodiments of the present invention.

The computer system 600 includes one or more processors 602, various support circuits 606, and memory 604. The processors 602 may include one or more microprocessors known in the art. The support circuits 606 for the processor 602 include conventional cache, power supplies, clock circuits, data registers, I/O interface 608, and the like. The I/O interface 608 may be directly coupled to the memory 1204 or coupled through the support circuits 606. The I/O interface 608 may also be configured for communication with input devices and/or output devices such as network devices, various storage devices, mouse, keyboard, display, video and audio sensors and the like.

The memory 604, or computer readable medium, stores non-transient processor-executable instructions and/or data that may be executed by and/or used by the processor 602. These processor-executable instructions may comprise firmware, software, and the like, or some combination thereof. Modules having processor-executable instructions that are stored in the memory 604 comprise a pre-processing module 610, a feature extraction module 612, a composite module 614, an enrollment module 616, an authentication module 618 and an identification module 620. Memory 604 may also contain data used by the modules 610-620. In other instances, portions of the data are stored on another server (for example, in cloud storage) for access and retrieval.

The computer system 600 may be programmed with one or more operating systems 650, which may include OS/2, Linux, SOLARIS, UNIX, HPUX, AIX, WINDOWS, IOS, and ANDROID among other known platforms. The memory 604 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 7:
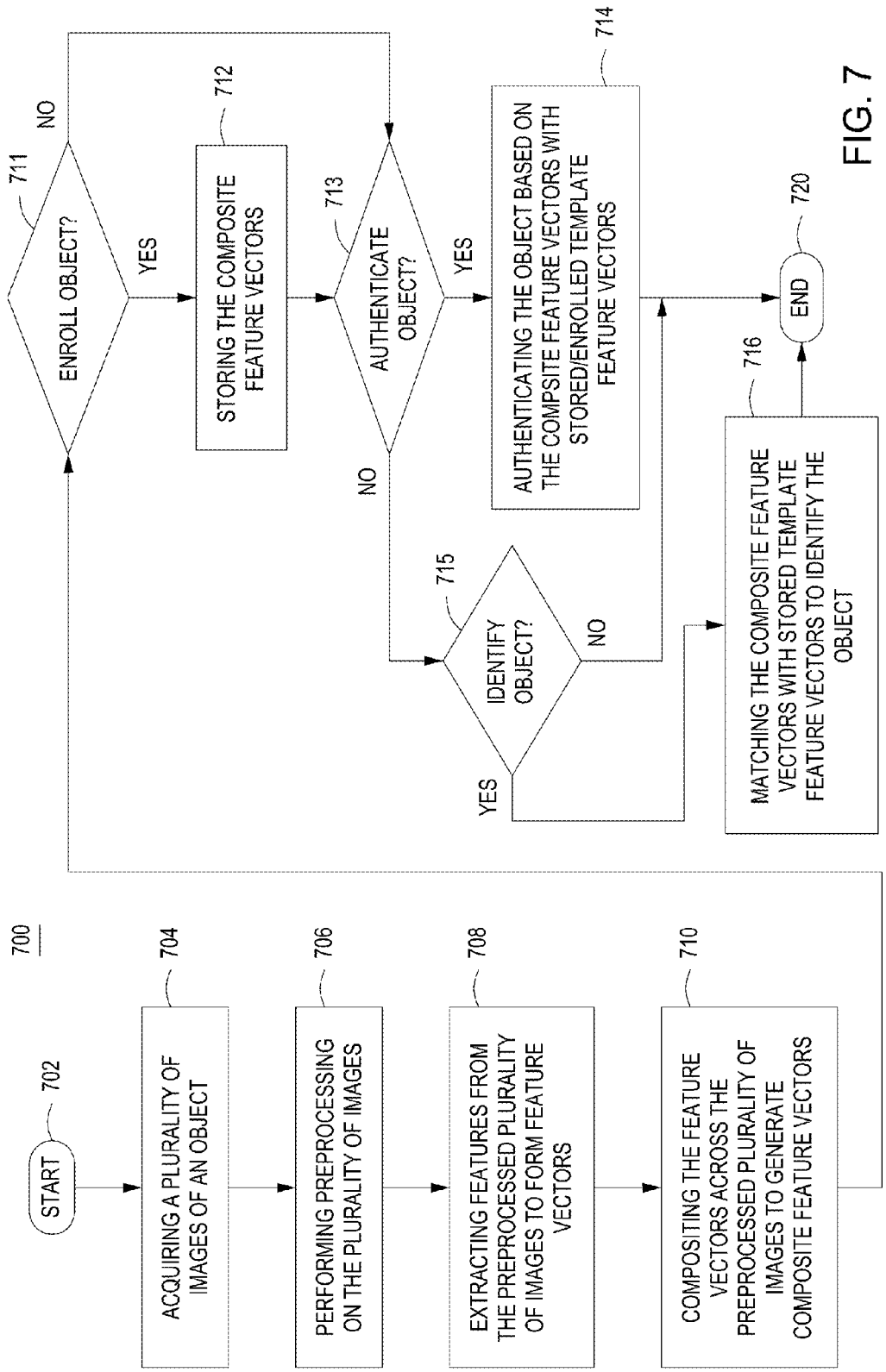
FIG. 7 is a flow diagram for a method for cross-modal matching of polarimetric image data in accordance with exemplary embodiments of the present invention.

FIG. 7 is a flow diagram for a method 700 for cross-modal matching of polarimetric image data in accordance with exemplary embodiments of the present invention. The method 700 is an implementation of the modules 600-620 operating on data, as executed by the processor 602.

The method begins at step 702 and proceeds to step 704. At step 704, the computer system 600 receives a plurality of face images. As described above, the plurality of images may be received directly from a thermal camera, over a network, or the like. In exemplary embodiments, the plurality of images comprises polarimetric images in the form of camera data from a polarimetric camera.

The method proceeds to step 706, where pre-processing is performed on the plurality of images by the pre-processing module 610. In some embodiments, pre-processing includes realigning the polarimetric images to canonical coordinates in order to enhance accuracy of matching with other cross-modal images. Further, pre-processing includes increasing signal to noise ratio in input images, and other techniques that result in better matching with cross-modal images including averaging local image patches, averaging several polarimetric image frames temporally and the like.

The method then proceeds to step 708, where features are extracted from the preprocessed plurality of images to form feature vectors by the feature extraction module 612. Each feature vector contains numerical representations of the strength and direction of an edge in a particular location of each polarimetric image. In some embodiments, the location may be a pixel, and in other embodiments, the location may be a region of the image comprising a plurality of pixels. Thus, there are a plurality of feature vectors corresponding to each polarimetric image, representing the features/edges in each polarimetric image.

The method then proceeds to step 710 where the composite module 614 composites the feature vectors across the preprocessed plurality of images to generate composite feature vectors. Specifically, the composite module 614 iterates over each pixel of each polarimetric image comprising the plurality of images, extracts the value and direction at that pixel from the feature vector, and averages that value with the other value and directions in the remaining polarimetric image feature vectors. Thus, the composite feature vector contains a feature vector for each pixel, the feature vector combining the information represented in a particular pixel or region of the polarimetric images $S_0$, $S_1$ and $S_2$.

At step 711, the enrollment module 616 determines whether the face whose images were obtained will be enrolled, i.e., stored, in a database for future querying, matching, analysis or verification. For example, if the facial recognition apparatus 100 is being used to authenticate users, a new user enrolls using an image of their face along with other identification means. If enrollment is desired, the method proceeds to step 712, where the composite feature vectors corresponding to the face are stored in a database.

At step 713, the authentication module 617 determines whether the face will be authenticated. For example, if a system requires authentication, where an ID and a face biometric are provided for comparison with the corresponding enrollment, the method will proceed to step 714. At step 714, the face is authenticated if the templates match.

At step 715, the identification module 620 determines whether the face will be identified. If not, the method terminates at step 720. If identification is requested, the method proceeds to step 716, where the composite feature vectors are matched with stored templates and a matched list is returned. The method terminates at step 720.

Figure 8:
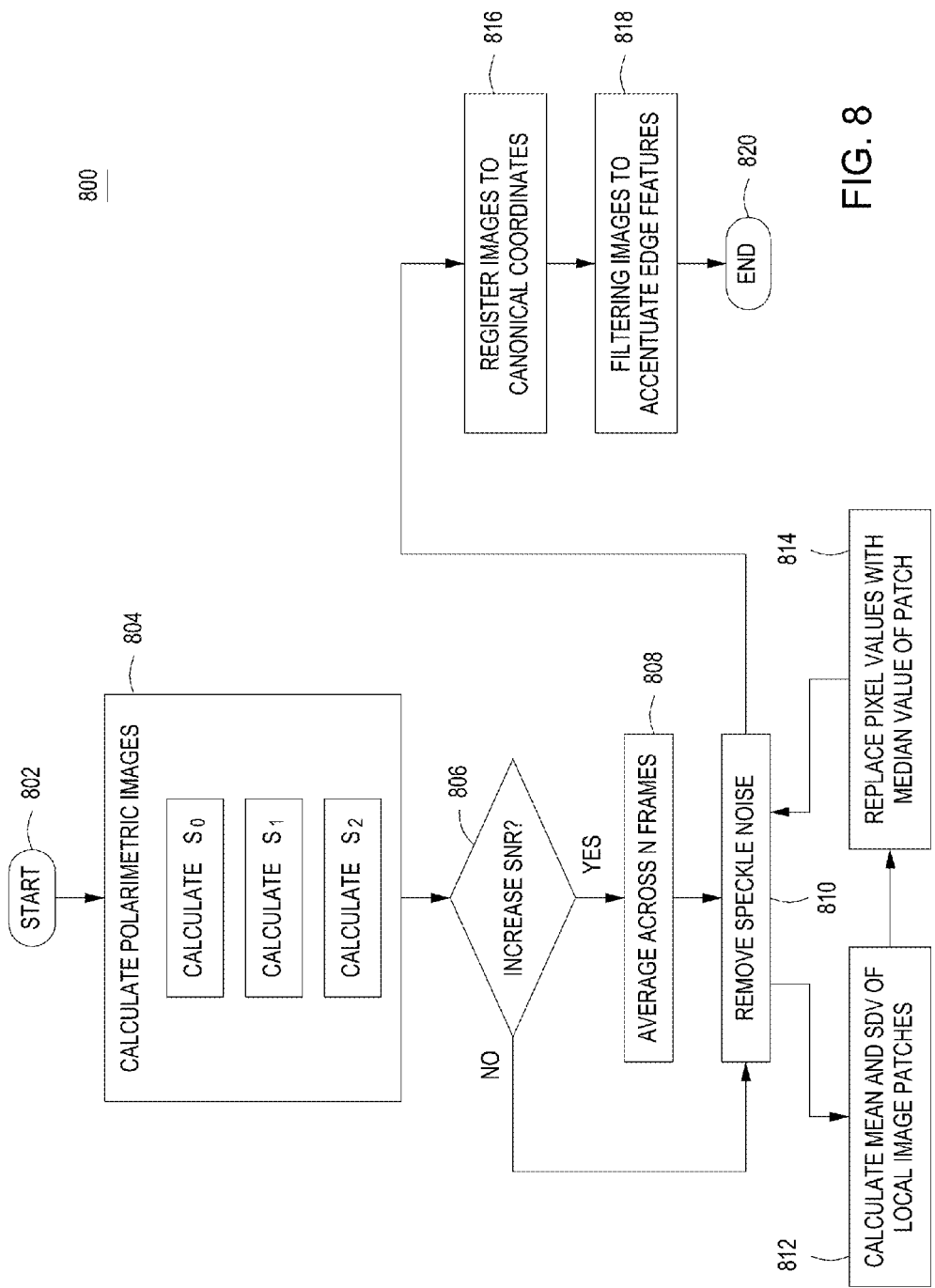
FIG. 8 is a flow diagram for a method for pre-processing of polarimetric image data for better cross-modal matching in accordance with exemplary embodiments of the present invention.

FIG. 8 is a flow diagram for a method 800 for preprocessing of polarimetric image data for better matching in accordance with exemplary embodiments of the present invention. The method 800 is an implementation of the preprocessing module 610, as executed by the processor 602.

The method begins at step 802 and proceeds to step 804. At step 804, the Stokes images are calculated based on the polarimetric measurements. At step 806, the method 800 determines whether signal to noise ratio (SNR) must be increased depending on the amount of noise detected in the images. If SNR is high enough (i.e., greater than a predetermined threshold), the method proceeds to step 810, where the polarimetric images $S_0$, $S_1$ and $S_2$ are averaged across a predetermined number of frames N. The images used for averaging are taken within a predetermined period of time by the polarimetric thermal camera 107 so that significant movement of face 101 is avoided.

At step 810, speckle noise is removed using methods described in step 812 and 814. At step 812, the mean and standard deviation of local image patches in the polarimetric images are determined. Once determined, outlier pixel values, i.e., those outside two standard deviations from the patch mean, in the local image patches are replaced with median values at step 816 in order to facilitate better feature extraction. At step 816, the averaged and modified images are registered to canonical coordinates. At step 818, the images are filtered to accentuate edge features. The method terminates at step 820.

Figure 9A:
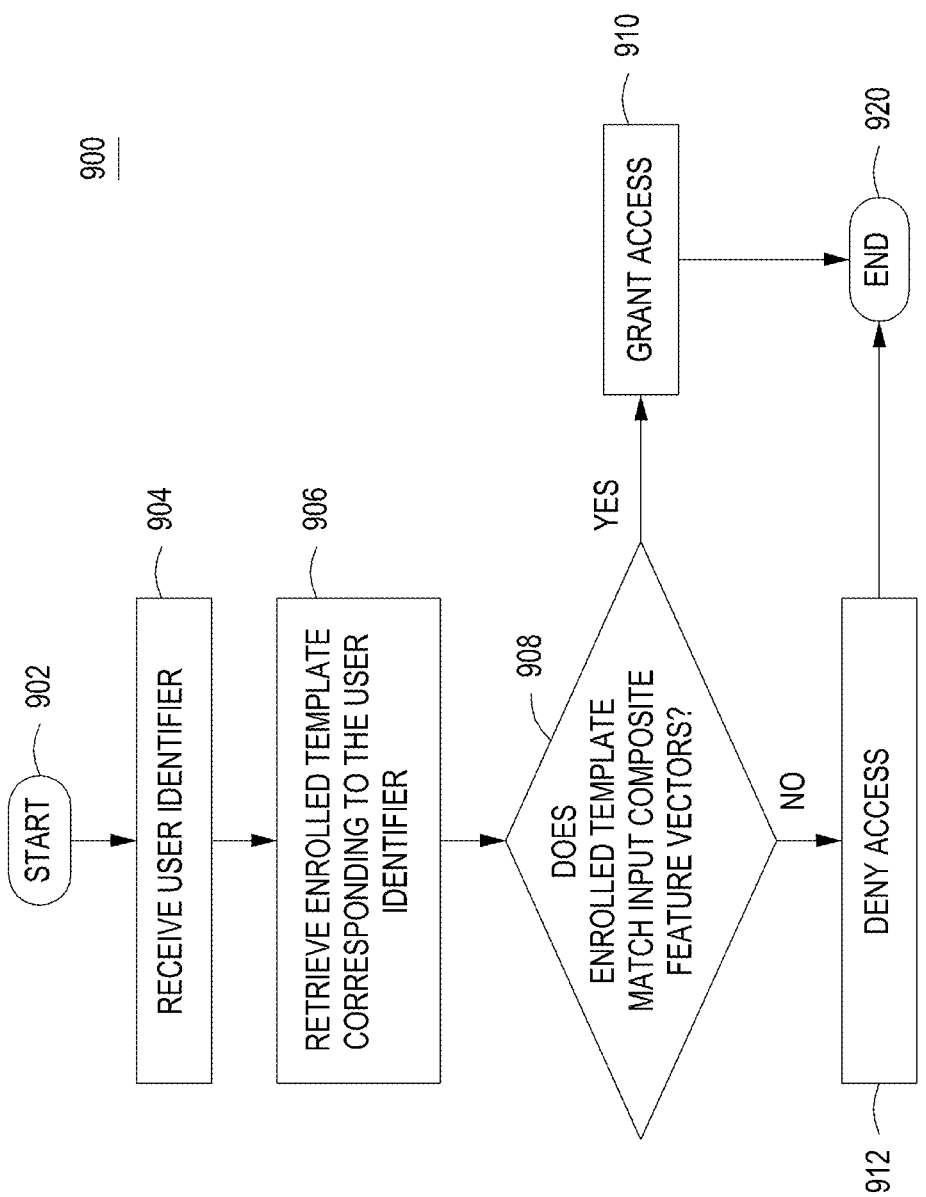
FIG. 9A is a flow diagram for a method for authenticating polarimetric image data in accordance with exemplary embodiments of the present invention.

FIG. 9 is a flow diagram for a method 900 for authentication of polarimetric image data in accordance with exemplary embodiments of the present invention. The method 900 is an implementation of the authentication module 618, as executed by the processor 602.

The method begins at step 902 and proceeds to step 904. At step 904, user identification associated with a user is received. In some embodiments, this user identification takes the form of a textual username. In other embodiments, the user identification is any form of secondary identification such as barcode, fingerprints, or the like.

At step 906, the enrolled template corresponding to the user identifier is retrieved. The template may comprise visible spectrum images of the user in addition to other identifying information such as feature vectors of other spectrum images corresponding to the user's facial features.

At step 908, the method 900 determines whether the enrolled template matches the computed composite feature vectors by applying various classification techniques, e.g., SVMs. If the template does not match the composite feature vectors, the method denies access to the user at step 912. If the template does match the composite feature vectors, the method 900 grants access to the user. The method terminates at step 920.

Figure 9B:
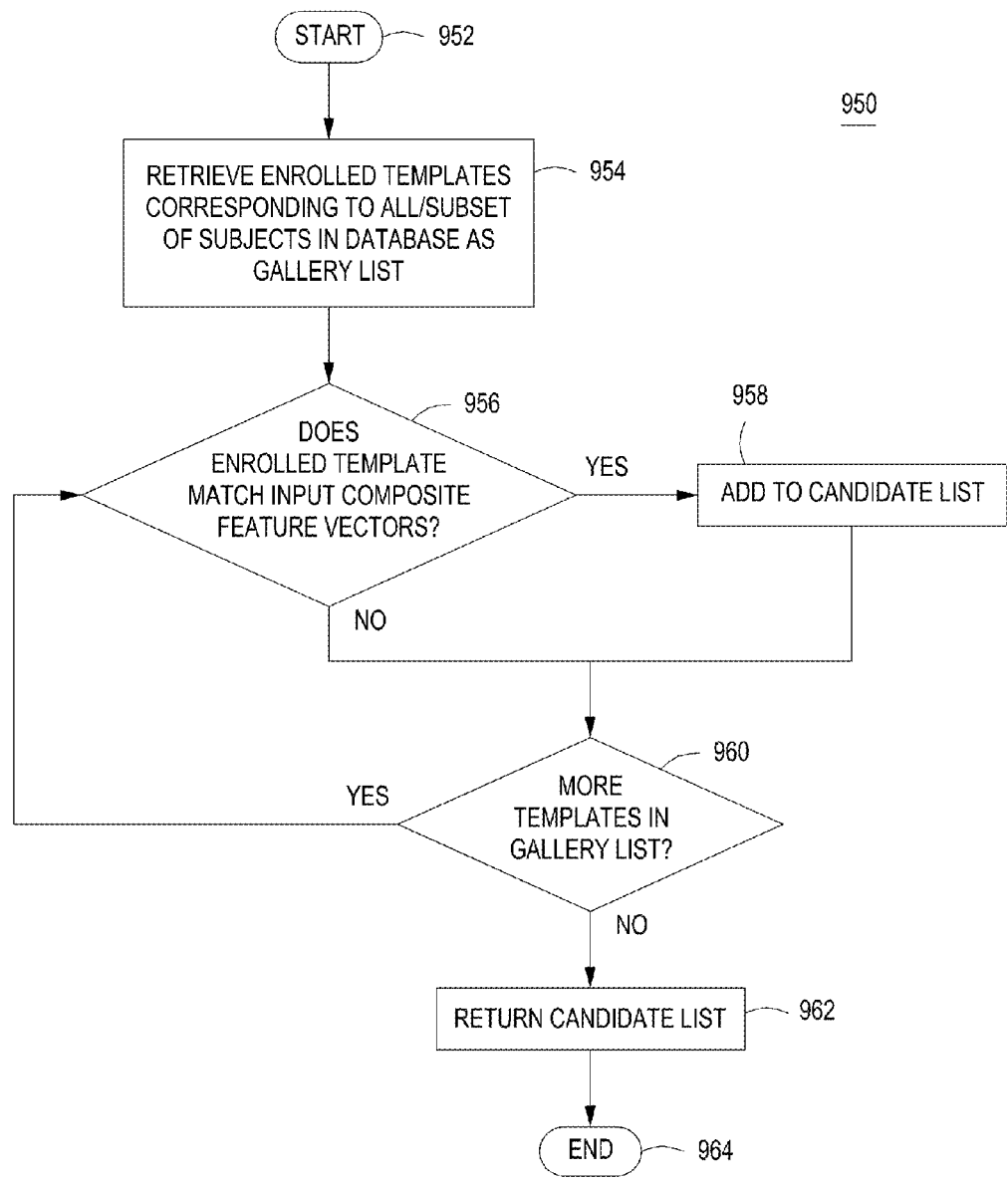
FIG. 9B is a flow diagram for a method for identification of polarimetric image data in accordance with exemplary embodiments of the present invention.

FIG. 9B is a flow diagram for a method 950 for identification of polarimetric image data in accordance with exemplary embodiments of the present invention. The method 950 is an implementation of the authentication module 618, as executed by the processor 602.

The method begins at step 952 and proceeds to step 954. At step 954, the enrolled templates corresponding to all (or a subset of, i.e., a watchlist) subjects in a database are retrieved and stored in a gallery list. The template may comprise visible spectrum images of the user in addition to other identifying information such as feature vectors of other spectrum images corresponding to the user's facial features.

At step 956, the method 950 determines whether the first enrolled template in the list matches the computed composite feature vectors by applying various classification techniques, e.g., SVMs. If the template does not match the composite feature vectors, the method moves to step 960. If the template does match the composite feature vectors, the method 900 adds the subjects to a candidate list at step 958.

At step 960, the method 950 determines if more subjects exist in the gallery list. If more subjects exist, the method 900 returns to step 956 to match the enrolled template with the next provided composite feature vector in the database or gallery list. If no more templates exist in the gallery list to match, the method 900 moves to step 962 and returns the cumulative set of matched templates (i.e., the candidate list). The method 900 terminates at step 964.

Figure 12:
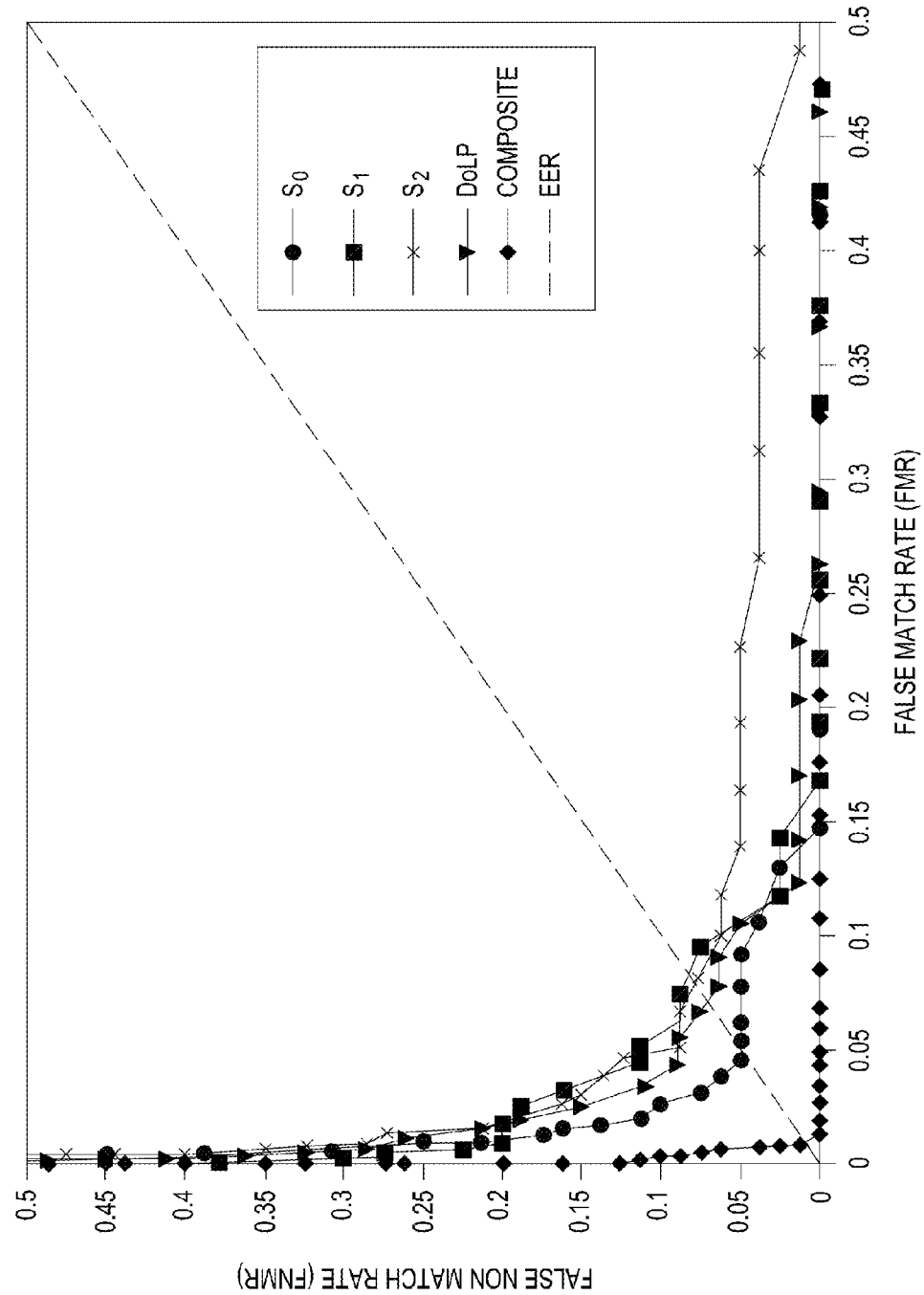
FIG. 12 illustrates a graph of accuracy comparisons in matching in accordance with exemplary embodiments of the present invention.
Figure 13:
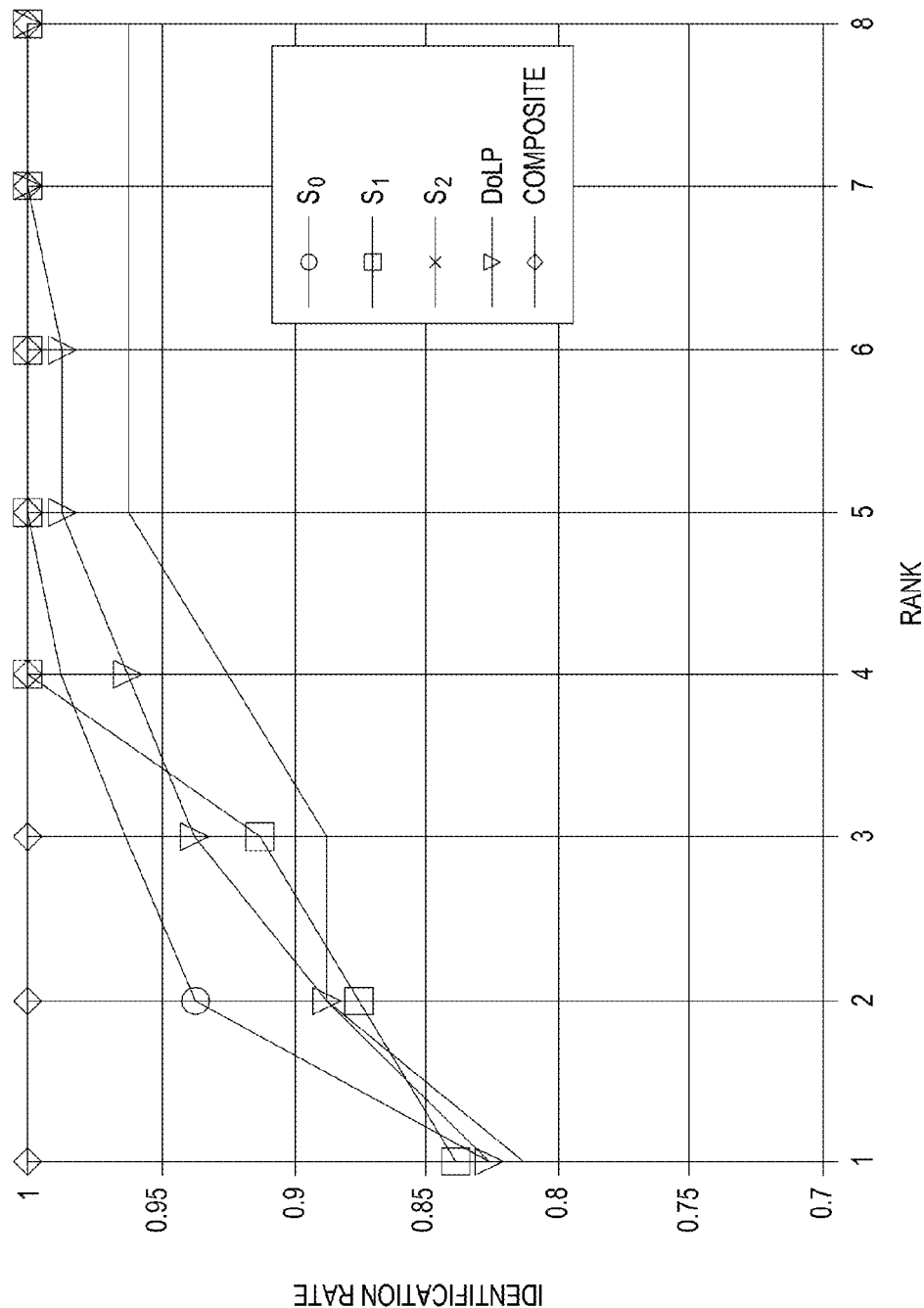
FIG. 13 illustrates a graph of identification rate using polarimetric image data in accordance with exemplary embodiments of the present invention.

FIGS. 12 and 13 illustrate graphs of accuracy comparisons and identification in matching in accordance with exemplary embodiments of the present invention. For user verification or authentication applications, receiver operator characteristic (ROC) curves summarize the performance of a system in terms of the false-positive rate (also referred to as the false-match rate in biometrics) with respect to the false-negative rate (referred to as the false-non-match rate in biometrics). For identification applications, a cumulative match characteristic (CMC) curve is used to describe the ability of the system to correctly identify an unknown probe sample from a set of known gallery images. In this scenario, the identification rate is reported as a function of rank, where the rank corresponds to the position of the true match in the score-based sorting of returned matches. FIG. 12 shows ROC curves and FIG. 13 shows CMC curves when using $S_0$, $S_1$, $S_2$, DoLP, or composite representation as the probe set for cross-modal face recognition. The composite feature representation, which is derived from a combination of the Stokes images, yields the highest performance in terms of the lowest FNMR at all examined FMR in FIG. 12, compared to conventional thermal (S0) or any individual Stokes components. Furthermore, the CMC curve shows that the composite feature representation yields the best Rank-1 identification rate of 100%, compared to conventional thermal.

Table 1 below highlights accuracy in matching and identification of the composite images as compared to each individual Stokes image.

TABLE 1

Key ROC and CMC Data Points from
Testing on 20 Subject Dataset

| Input | Rank-1 ID (%) | EER (%) | FMR100 |
|---|---|---|---|
| S0 | 82.5 | 5.0 | 21.0 |
| S1 | 83.7 | 7.6 | 20.4 |
| S2 | 81.2 | 7.8 | 28.7 |
| DoLP | 82.5 | 7.0 | 26.6 |
| Composite | 100 | 0.9 | 0.9 |

Figure 14:
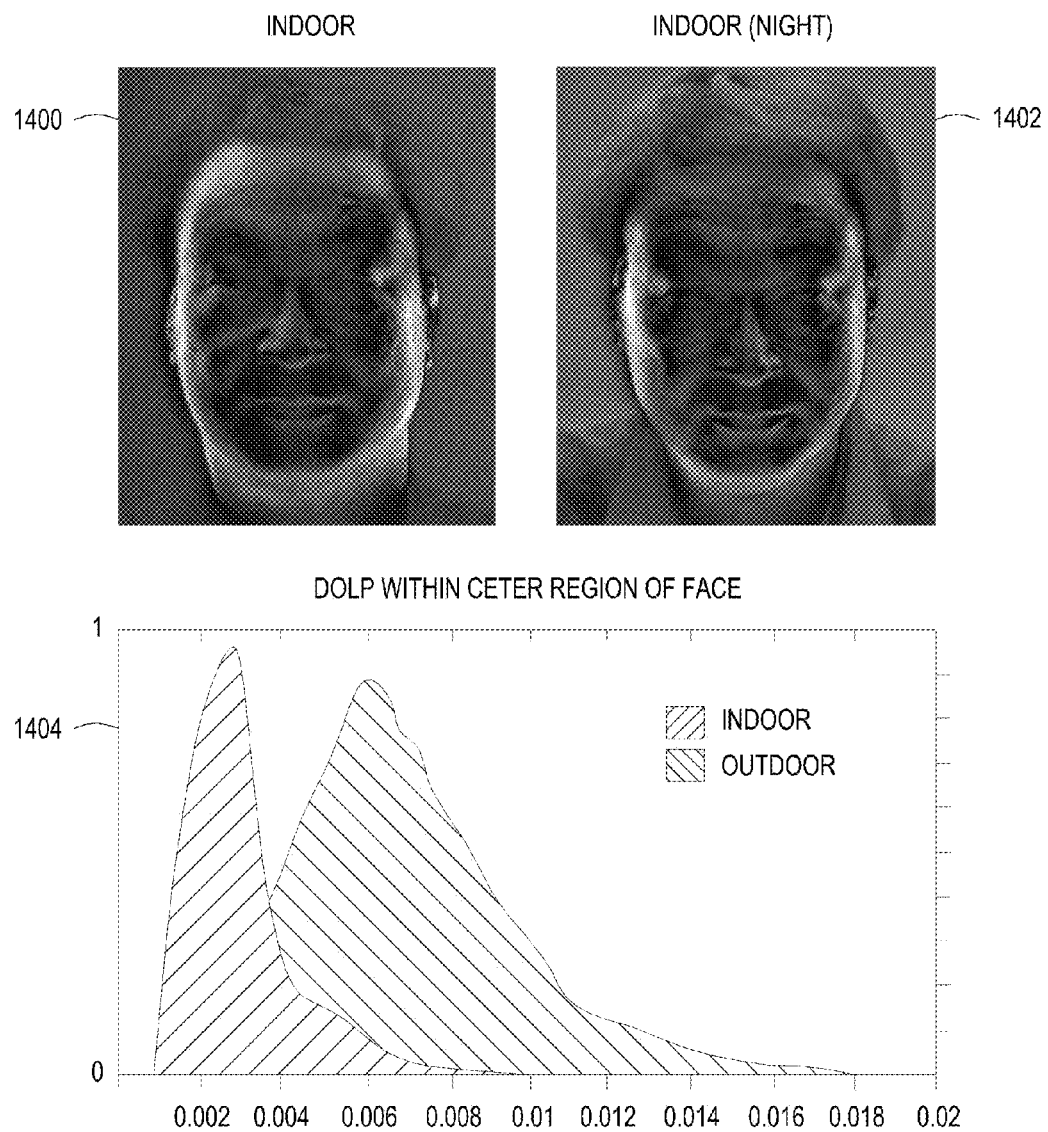
FIG. 14 illustrates images that can be identified indoors or outdoors at various times of the day in accordance with exemplary embodiments of the present invention.

FIG. 14 illustrates images that can be identified indoors or outdoors at various times of the day in accordance with exemplary embodiments of the present invention. The images show an indoor image 1400 and an outdoor image 1402 at night where features can be clearly discerned using the combination of the techniques described above. Graph 1404 shows the dynamic range of measured DoLP values from each of the images, indicating greater detail in the outdoor imagery.

The foregoing description, for purpose of explanation, has been described with reference to specific embodiments. However, the illustrative discussions above are not intended to be exhaustive or to limit embodiments of the present invention to the precise forms disclosed. Many modifications and variations are possible in view of the above teachings. The embodiments were chosen and described in order to best explain the principles of the present disclosure and its practical applications, to thereby enable others skilled in the art to best utilize embodiments of the present invention with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

REFERENCE NUMERALS

ARL15-11

100 facial recognition apparatus
101 face
102 pre-processing module
104 feature extraction module
106 feature vectors
107 thermal polarimetric camera
108 composite module
109 camera data
110 composite feature vectors
112 enrollment module
114 authentication module
116 identification module
118 results
150 database
200 signal module
202 noise removal module
204 patch module
205 registration module
206 filtering module
230 visible face images
232 visible pre-processed images
300 $S_0P$ feature vectors
302 $S_1P$ feature vectors
304 $S_2P$ feature vectors
306 visible feature vectors
600 computer system
602 processor
606 support circuits
608 I/O interface
610 pre-processing module
612 feature extraction module
614 composite module
616 enrollment module
618 authentication module
620 identification module
650 operating systems
700 method
702 step
704 step
706 step
708 step
710 step
711 step
713 step
714 step
715 step
720 step
800 method
802 step
804 step
806 step
810 step
812 step
814 step
816 step
818 step
820 step
900 method
902 step
904 step
906 step
908 step
912 step
920 step
950 method
952 step
954 step
956 step
958 step
960 step
964 step
1000 top row
1002 middle row
1100 visual illustration
1204 memory
1400 indoor image
1402 outdoor image
1404 graph
1500 image
1502 image
1504 image
1506 polarimetric images
1508 polarimetric images
1510 polarimetric images

The invention claimed is:

1. A method for cross-modal face matching using polarimetric thermal image data, comprising:

receiving a plurality of polarimetric thermal images of a face;
extracting features of the face from each of the plurality of images to generate a plurality of feature vectors for each of the plurality of images;
compositing the feature vectors for each of the plurality of images together to form composite feature vectors; and
matching the composite feature vectors with other feature vectors in order to determine whether the face matches a face represented by the other feature vectors.

2. The method of claim 1, further comprising pre-processing the plurality of images to enhance feature extraction.

3. The method of claim 2, wherein preprocessing comprises at least one of:
increasing signal to noise ratio in the plurality of images by averaging the plurality of images across a predetermined number of temporal frames;
removing speckle noise from the plurality of images by replacing local pixel values in the plurality of images with median grayscale pixel values of local image regions;
registering the plurality of images to canonical coordinates; or
filtering the plurality of images to accentuate edges.

4. The method of claim 2, wherein preprocessing includes registering the plurality of images to canonical coordinates, and wherein registering the plurality of images further comprises:
selecting fiducial points in a set of visible images and the plurality of polarimetric thermal images; and
computing a spatial transformation to align the visible images and the plurality of polarimetric thermal images to the canonical coordinates where the fiducial points are in predetermined positions.

5. The method of claim 1, further comprising:
receiving user identification associated with a user;
retrieving an enrolled template corresponding to the user identification; and
determining whether the enrolled template matches with the composite feature vectors in order to deny or allow physical or logical access.

6. The method of claim 1, wherein polarimetric images comprise Stokes images $S_0$, $S_1$ and $S_2$.

7. The method of claim 6, wherein feature vectors are extracted from each of the Stokes images: $S_0$, $S_1$ and $S_2$.

8. The method of claim 7, wherein the feature vectors contain values indicating strength and direction of an edge at a particular location in each of the plurality of images.

9. The method of claim 8, wherein compositing the feature vectors comprises fusing each value across a spatial region of a feature set corresponding to the plurality of images.

10. The method of claim 7, wherein extracting features further comprises:
utilizing edge-based features, to represent the face in the plurality of images;
performing dimensionality reduction to reduce the size of features used for classification
classifying resulting features to determine the level of similarities between two feature vectors.

11. The method of claim 10, wherein the edge-based features are histograms of oriented gradients (HOG).

12. The method of claim 10, wherein the dimensionality reduction comprises performing principal component analysis.

13. The method of claim 10, wherein classifying the resulting features comprises using support vector machines (SVM).

14. The method of claim 1, wherein the other feature vectors are generated from visible images or polarimetric thermal images.

15. An apparatus for cross-modal matching with polarimetric thermal image data comprising:
a feature extraction module configured to extract features of a face from a plurality of polarimetric thermal images to generate a plurality of feature vectors for each of the plurality of images;
a composite module configured to composite the feature vectors for each of the plurality of images together to form composite feature vectors; and
an identification module configured to match the composite feature vectors with other feature vectors in order to determine one or more faces in a database of faces that are most similar to the composite feature vectors.

16. The apparatus of claim 15 further comprising a pre-processing module that pre-processes the plurality of images to facilitate feature extraction.

17. The apparatus of claim 16, wherein preprocessing comprises:
increasing signal to noise ratio in the plurality of images by averaging the plurality of images across a predetermined number of temporal frames;
removing speckle noise from the plurality of images by:
replacing local pixel values in the plurality of images with median values; and
registering the plurality of images to canonical coordinates; and
filtering the plurality of images to accentuate edge features.

18. The apparatus of claim 17, wherein registering the plurality of images is performed by a registration module which:
selects fiducial points in a set of visible images and the plurality of polarimetric thermal images; and
computes a spatial transformation to align the visible images and the plurality of polarimetric thermal images to the canonical coordinates where the fiducial points are in predetermined positions.

19. The apparatus of claim 15, further comprising an enrollment module that receives user identification associated with a user and inserts an entry corresponding to the user identification and the composite feature vectors into the database.

20. The apparatus of claim 19, further comprising an authentication module that determines whether an enrolled template corresponding to a provided unique identifier matches with the composite feature vectors in order to deny or allow physical or logical access.

21. A method for cross-modal face matching using polarimetric thermal image data and visible image data, comprising:
receiving one or more polarimetric thermal images of a face;
extracting features of the face from the one or more polarimetric thermal images to generate a plurality of polarimetric thermal feature vectors for the one or more polarimetric thermal images;
compositing the polarimetric thermal feature vectors for the one or more polarimetric thermal images together to form at least one composite polarimetric thermal feature vector;

receiving one or more reference visible images of a face;
extracting reference visible feature vectors of the face from the one or more visible images to generate a plurality of reference visible feature vectors for the one or more reference visible images; and
matching the at least one composite polarimetric thermal feature vectors with the reference visible feature vectors in order to determine whether the one or more polarimetric thermal images of the face matches the one or more reference visible images of the face represented by the reference visible feature vectors.

\* \* \* \* \*